(12) United States Patent
Knab et al.

(10) Patent No.: US 6,634,512 B2
(45) Date of Patent: Oct. 21, 2003

(54) BASIC RACK

(75) Inventors: Josef Knab, Rossbach (DE);
Alexander Prinz, Postmuenster (DE);
Siegfried Schneiderbauer, Rossbach (DE); Klaus Neuwardt, Simbach (DE)

(73) Assignee: Knuerr-Mechanik fuer die Elektronik Aktiengesellschaft, Munich (DE)

( * ) Notice: Subject to any disclaimer, the term of this patent is extended or adjusted under 35 U.S.C. 154(b) by 0 days.

(21) Appl. No.: 09/840,863

(22) Filed: Apr. 25, 2001

(65) Prior Publication Data

US 2001/0037988 A1 Nov. 8, 2001

(30) Foreign Application Priority Data

May 4, 2000 (DE) .......................... 100 21 718

(51) Int. Cl.7 ............................................... A47B 43/00
(52) U.S. Cl. ....................................................... 211/189
(58) Field of Search .......................... 211/189, 26, 182, 211/195, 183; 312/265.1; 403/231

(56) References Cited

U.S. PATENT DOCUMENTS

| | | | |
|---|---|---|---|
| 3,353,854 A | | 11/1967 | Hansen |
| 4,045,104 A | * | 8/1977 | Peterson |
| 4,869,380 A | * | 9/1989 | Metcalfe et al. |
| 5,695,263 A | | 12/1997 | Simon et al. |
| 5,820,289 A | * | 10/1998 | Kern et al. |
| 6,231,142 B1 | * | 5/2001 | Pochet |

FOREIGN PATENT DOCUMENTS

| | | | |
|---|---|---|---|
| DE | 93 02 769.2 | 5/1993 | ............ H05K/5/00 |
| DE | 691 01 727 T2 | 9/1994 | ............ H05K/7/18 |
| DE | 195 29 270 C1 | 10/1996 | ............ H05K/7/18 |
| DE | 297 12 998 | 9/1997 | |
| GB | 895 462 | 5/1962 | |

* cited by examiner

Primary Examiner—Alvin Chin-Shue
Assistant Examiner—Sarah Purol
(74) Attorney, Agent, or Firm—Jacobson Holman PLLC

(57) ABSTRACT

In a basic rack, particularly for equipment cabinets, which has transverse profiles, depth profiles and vertical profiles connected by corner connectors, the profiles engageable on the fixing extensions of the corner connectors are fixed from the inside of the basic rack with the aid of one clamping device and one connecting element in a clamping fastening. In an advantageous development the transverse, depth and vertical profiles, as well as the associated fixing extensions of the corner connectors having a triangular construction.

25 Claims, 4 Drawing Sheets

BASIC RACK

BACKGROUND OF THE INVENTION

1. Field of the Invention

The present invention relates to a basic rack, particularly for equipment cabinets, having transverse profiles, depth profiles and vertical profiles, which are connected by means of corner connectors, each corner connector having three fixing extensions on which can be mounted and fixed a transverse profile, a depth profile and a vertical profile.

The invention is suitable for cabinets, casings and containers, preferably for cabinets which are intended to receive electrical and electronic equipment and components, e.g. for LAN, computer and server cabinets. The invention can also be used for worktables and in particular workshop benches, in which three beams or profiles are arranged at right angles to one another and are connected with the aid of a corner connector.

2. Description of the Related Art

DE 93 02 769 U1 discloses an equipment cabinet, which has guide members for mounting purposes and through holes for fastening the vertical, horizontal or depth beam with the aid of fastening elements. The guide members are constructed on front connecting faces of the corner connector and cooperate with a complimentary front opening of the beams. The fastening of the mounted beams subsequently takes place with three fastening elements guided in through holes of the corner connector and which are in each case inserted and secured in correspondingly constructed fastening openings of the beams.

A basic rack for equipment cabinets described in DE 195 29 270 C1 also has corner connectors with three extensions. The extensions have the same square or circular cross-section as the mountable profiles. For permanent electrical connection as well as for mechanical fastening of a mounted hollow profile, which cannot be released without destruction, each member has at least one depression in which it is necessary to press manually or with the aid of a tool material of the hollow profile, e.g. of a punched out tongue.

DE 691 01 727 T2 discloses a basic rack with transverse, depth and vertical profiles, which are detachably connected by means of corner connectors having three fixing extensions. The profiles and fixing extensions have a triangular cross-section. Detachable fastening takes place by jamming the profiles engaged on the fixing extensions and subsequently screwing down. For the jamming of the engaged profiles each fixing extension is provided with a transverse slit, whose width can be correspondingly increased by a supportable screw.

In the prior art basic racks each profile is individually connected to the associated fixing extension of the corner connector and in each case at least one fastening element is required and also a corresponding fastening process, which must be performed manually or with the aid of a tool.

SUMMARY OF THE INVENTION

The object of the invention is to create a stable basic rack for equipment cabinets, etc. which permits a particularly simple construction as well as an inexpensive manufacture and an extremely efficient installation.

According to the invention this object is achieved by a basic rack having transverse profiles, depth profiles and vertical profiles, which are connected by means of corner connectors having three fixing extensions, in that the fixing of a transverse profile, depth profile and vertical profile engaged on the fixing extensions of a corner connector takes place with the aid of a clamping means. For a clamping retention of the engaged profiles the clamping means is provided with clamping legs and can be fastened with the aid of one connecting element to a corner connector.

A fundamental idea of the present invention is that the profiles, i.e. a transverse profile, depth profile and vertical profile mountable on the three fixing extensions of a corner connector are simultaneously fastened in a single connecting process with the aid of a single fastening means.

According to the invention the fastening means is constituted by a clamping means, which can be positioned as an inner part of the corner arrangement and with in each case at least two clamping legs permits a fixing of one mounted profile.

It is particularly advantageous that the clamping means has clamping legs arranged at right angles to one another and which due to their vertical and horizontal arrangement in a fastening position in each case embrace two lateral faces of the mounted profiles, i.e. the transverse profile, depth profile and vertical profile, and in a clamping retention securely retain the same on the corner connector.

The connecting element is preferably constituted by a fastening screw. This fastening screw is guided through a hole, which is appropriately formed centrally and at the intersection of all six clamping legs of the clamping means and is secured in a corner connector hole aligned in the fastening position.

Appropriately the hole in the corner connector is formed in a corner part and is provided with a thread. The corner part is formed in the intersection of the corner connector fixing extensions arranged in the direction of the rectangular space coordinates x, y and z. The threaded hole in the corner part of the corner connector and the central hole in the clamping means aligned in the fastening position are oriented in a roughly diagonal manner.

The clamping means and in particular the clamping legs are constructed in complimentary manner to the fixing extensions of the corner connector and the engaged profiles and extend over at least two adjacent lateral faces of the profiles or fixing extensions respectively positioned at right angles to one another. The profiles and fixing extensions can have a rectangular or square cross-section. From the manufacturing standpoint it is advantageous to manufacture the transverse profiles, depth profiles and vertical profiles from a hollow profile or section, e.g. by cutting to length.

In a particularly advantageous development the hollow profile has a triangular cross-section and two equally long lateral faces form a right angle and in the fastening position are directed towards an inner area formed by the basic rack. The fixing extensions of the corner connector are provided in complimentary manner with correspondingly oriented lateral faces and the clamping means has for a clamping retention clamping legs constructed and oriented in complimentary manner.

It is advantageous that due to the use of a clamping means fundamentally a detachable or undetachable fixing of the engaged fixing extensions is possible. A detachable connection is obtained if the profiles are mounted with a minimum clearance on the fixing extensions and are subsequently fastened with the aid of the clamping means and the central screw to the corner connector.

An undetachable fastening is brought about by additional locking and/or engagement elements on the fixing extensions or protuberances on the clamping legs of the clamping means or complimentary recesses. Through the clamping means engaging and being firmly screwed with the aid of the connecting element with its clamping legs and protuberances to the mounted profiles, a frictional and positive engagement occurs, in which the protuberances press material areas of the profiles into the recesses of the fixing extensions.

In a fastening variant the fixing extensions of the corner connector can be provided with engagement elements, e.g. wedge-like noses. Complimentary openings in the transverse, depth and vertical profiles ensure a locking of the engagement elements in the mounted position and a particularly secure corner connection following the fixing of the clamping means.

A further fastening possibility for the mounted profiles can be obtained in that the fixing extensions are provided with at least one hole, which is e.g. positioned horizontally and in the terminal fastening areas of the profiles to be engaged is formed at least one hole having a smaller diameter. If complimentary protuberances are formed on the clamping legs of the clamping means, the projecting material of the profiles can be pressed into the through hole of the fixing extensions, if the clamping means is fixed to the corner connector with the aid of the central screw.

A detachable or undetachable fastening of the transverse, depth and vertical profiles to the fixing extensions of the corner connectors can also be obtained with the aid of an adhesive and it is appropriate to form grooves, particularly longitudinal grooves on the fixing extensions for receiving the adhesive when fixing to the clamping means.

The transverse, depth and vertical profiles can be provided with fastening openings, which preferably have a grid-like construction, so as to permit a fastening of mountings, e.g. built-in rails. It can also be advantageous to use profiles with an additional fastening web and fastening openings formed therein, the fastening web being arranged in aligned manner to an internally positioned lateral face. Additionally a further and in particular parallel-positioned retaining web can be provided, which can e.g. serve for the fastening of lining or covering parts of the equipment cabinet.

BRIEF DESCRIPTION OF THE DRAWINGS

The invention is described in greater detail hereinafter relative to the attached diagrammatic drawings, wherein show.

DESCRIPTION OF THE PREFERRED EMBODIMENTS

Figure 1:
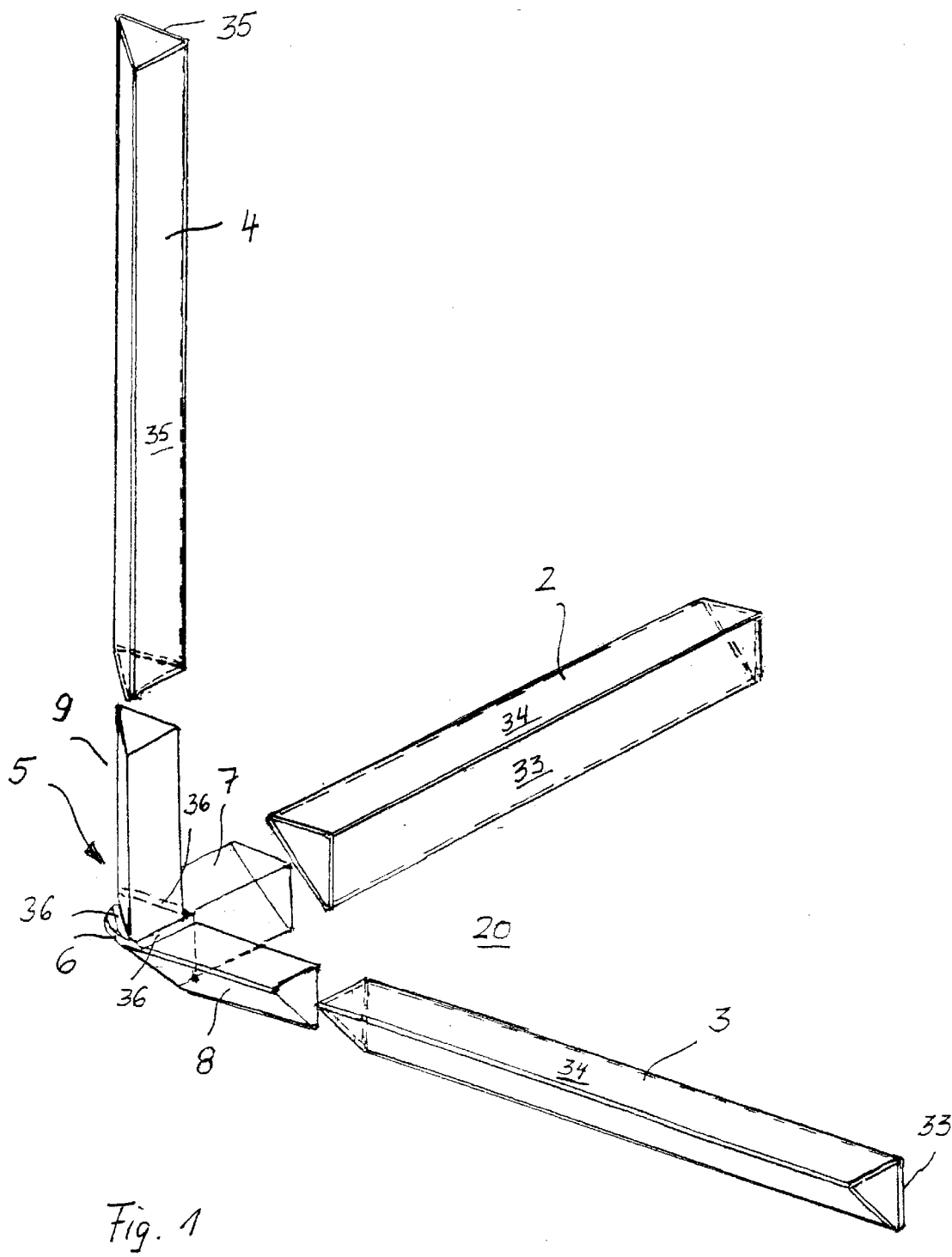
FIG. 1 A perspective, rear view of a corner connection of a basic rack according to the invention having a corner connector and a mountable transverse profile, depth profile and vertical profile.

FIG. 1 shows a corner connection or arrangement for a basic rack of an equipment cabinet in a pulled apart, unfastened state. The aft corner connection comprises a corner connector 5 having three fixing extensions 7, 8, 9 formed on a corner part 6 and profiles mountable on the fixing extensions 7, 8, 9, namely a transverse profile 2, depth profile 3 and vertical profile 4. In the mounted, fastened state the profiles 2, 3, 4 form a left-hand, rear rack corner or angle.

The fixing extensions 7, 8, 9 of the corner connector 5 have a triangular cross-section. On the fixing extensions 7, 8, 9 can be mounted or engaged with limited clearance the transverse profile 2, depth profile 3 and vertical profile 4 cut to length from a triangular hollow profile. Following the mounting of the profiles 2, 3, 4 fixing takes place with the aid of a clamping means 10, which will be described in conjunction with FIG. 2.

The hollow profiles 2, 3, 4 and complimentary fixing extensions 7, 8, 9 of the corner connector 5 are cross-sectionally constructed as a right-angled triangle, the lateral faces 33, 34 of the transverse profile 2 and depth profile 3, as well as the lateral faces 35 of the vertical profile 4 forming a right angle and being directed towards an inner area 20. The corner part 6 of the corner connector 5 is constructed in complimentary manner to the three fixing extensions 7, 8, 9 and has at least one stop area 36 for each profile 2, 3, 4.

The profiles 2, 3, 4 shown in FIG. 1 can be provided with not shown fastening openings. It is also possible to use profiles 2, 3, 4 with an additional, not shown fastening web, which can e.g. be positioned perpendicular and in aligned manner to the lateral face 33 of the transverse and depth profiles 2, 3 and to the lateral face 35 of the vertical profile 4. For the arrangement of the clamping means 10 (cf. FIG. 2), the fastening webs then have terminal recesses or only extend up to the clamping means 10.

Figure 2:
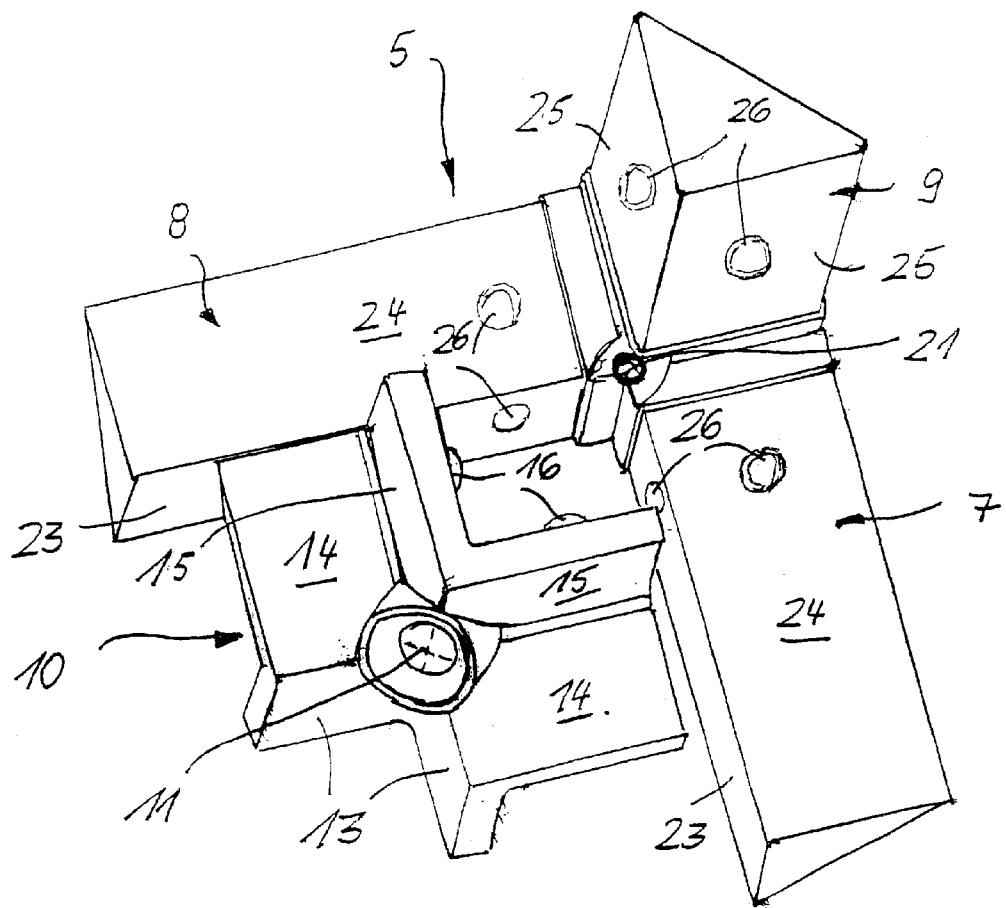
FIG. 2 A perspective inside view of a corner connection with a corner connector and a clamping means.

FIG. 2 shows in a pulled apart, perspective view a corner connector 5 and a clamping means 10. The clamping means 10 is used for the secure fastening of the profiles 2, 3, 4 engaged or put on the plug-in members 7, 8, 9. To facilitate understanding FIG. 2 does not show the profiles 2, 3, 4.

The clamping means 10 is constructed in complimentary manner to the fixing extensions 7, 8, 9 or the profiles 2, 3, 4 mounted thereon and has clamping legs 13, 14, 15, positioned at right angles to one another, for a clamping retention of the mounted profiles 2, 3, 4. The clamping legs 13, 14, 15 are dimensioned in such a way that the profiles 2, 3, 4 to be fastened in a clamping retention are covered in the area of their lateral faces 33, 34, 35 arranged at right angles to one another (cf. FIG. 1) and the complimentary lateral faces 23, 24, 25 of the fixing extensions 7, 8, 9.

A frictional and non-positive fixing by the clamping means 10 is brought about if the vertical lateral faces 23 and horizontal lateral faces 24 of the fixing extensions 7, 8 and the vertical lateral faces 25 of the fixing extension 9 are provided in each case with at least one recess 26, e.g. a depression, for receiving material of the mounted profiles 2, 3, 4. On fastening the clamping means 10 the material of the profiles 2, 3, 4 is pressed in by protuberances 16 on the inner faces of the clamping legs 13, 14, 15, e.g. clamping studs.

The clamping retention with an advantageous frictional and non-positive engagement takes place if the clamping means 10 is fastened with the aid of a connecting element, e.g. a not shown, central screw to the corner connector 5. For this purpose in the intersection of the clamping legs 13, 14, 15 is formed a hole 11 for guiding the not shown clamping element. In the fastening position said hole 11 is aligned with a hole 21 in the corner connector 5, namely in the corner part 6, which is provided with a thread.

Figure 3:
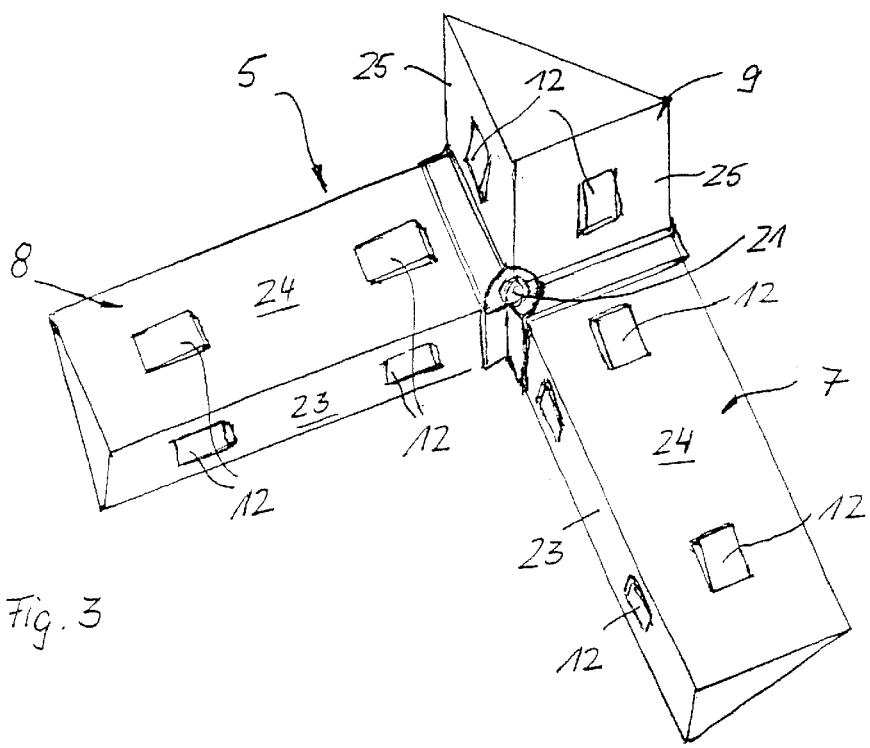
FIG. 3 A perspective view of an alternatively constructed corner connector.

FIG. 3 shows an alternative construction of a corner connector 5. In the lateral faces 23, 24, 25 constructed for cooperating with the not shown clamping means 10, the fixing extensions 7, 8, 9 have engagement elements 12. The engagement elements 12 are constructed as wedge-like noses and cooperate with complimentary constructed, e.g. rectangular recesses in the mountable, not shown profiles 2, 3, 4. The wedge-like construction of the engagement elements 12 permits a sliding mounting and locking of the profiles 2, 3, 4, accompanied by the formation of a clamping area with positive and frictional engagement. Following the mounting and locking of the profiles a clamping retention is brought about with a clamping means 10 (cf. FIG. 2) and a not shown connecting element, which leads to a particularly stable corner arrangement or connection.

Figure 4:
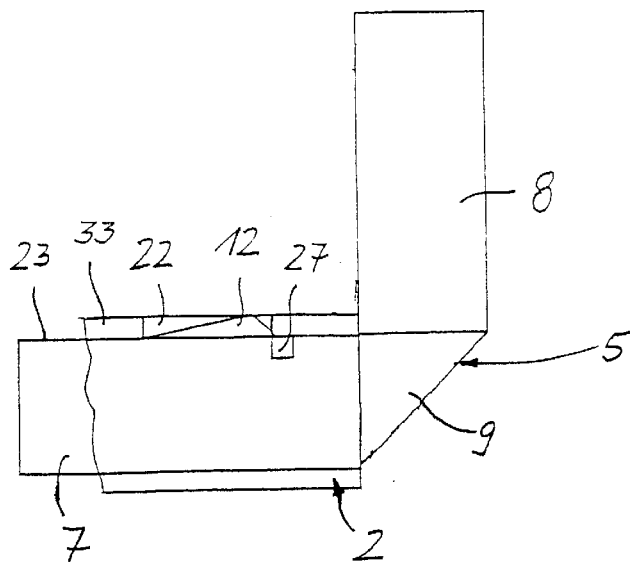
FIG. 4 A plan view of a corner connector with engaged, fastened transverse profile.

In a plan view of a corner connector 5 with fixing extensions 7, 8, 9 and a transverse profile 2 engaged on the fixing extension 7, FIG. 4 shows the locking fastening in accordance with FIG. 3. To facilitate understanding FIG. 4 only shows one engagement element 12 on the vertical lateral face 23 of the fixing extension 7 and one recess 22 in the adjacent, vertical lateral face 33 of the transverse profile 2. Adjacent to the engagement element 12 a reception opening 27 is provided in the fixing extension 7 for chips produced during mounting the profile 2.

Figure 5:
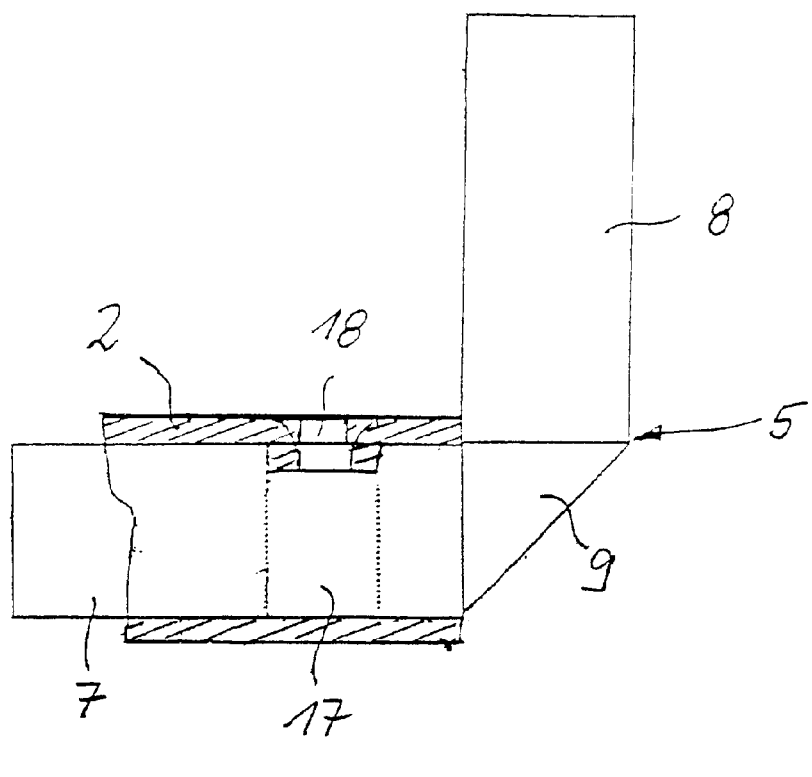
FIG. 5 A plan view of a corner connector with engaged, fastened transverse profile in a further fastening variant.

A further, alternative prefixing of the profiles 2, 3, 4 is illustrated in FIG. 5 showing a transverse profile 2 engaged on the fixing extension 7. The fixing extension 7 contains a through hole 17 and in the mounted transverse profile 2 a hole 18 aligned with the through hole 17, but with a smaller diameter. If a clamping means 10 with correspondingly constructed protuberances 16 (cf. FIG. 2) is fixed, in the manner shown in FIG. 5 the projecting material of the transverse profile 2 passes into the through hole 17 and in this way ensures a stable fastening.

Figure 6:
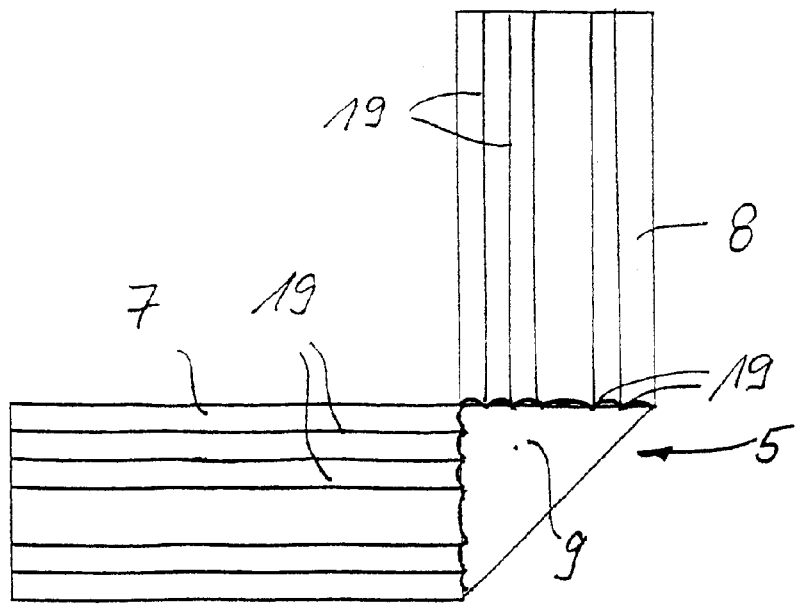
FIG. 6 A plan view of a corner connector for an adhesive fastening of a transverse, depth and vertical profile.

FIG. 6 shows a corner connector 5 provided with grooves 19 in the fixing extensions 7, 8, 9. The grooves 19 are used for receiving an adhesive following the engagement of the associated profiles 2, 3, 4 and the fastening of the clamping means 10 (cf. FIG. 2).

Important advantages of the basic rack according to the invention are the installation-friendly, efficient fastening of the transverse, depth and vertical profiles to the corner connectors and a secure and stable fastening with the aid of in each case one clamping means per corner connection.

What is claimed is:

1. Basic rack comprising:

transverse profiles, depth profiles and vertical profiles, connected by corner connectors, each corner connector having three fixing extensions for mounting and fixing a transverse profile, a depth profile and a vertical profile, one clamping means being provided for the fixing of one transverse profile, depth profile and vertical profile mounted on the fixing extensions of the corner connector, the clamping means having clamping legs for a clamping retention of the transverse profile, depth profile and vertical profile mounted on the fixing extensions, and the clamping means being fixable to the corner connector with the aid of one connecting element.

2. Basic rack according to claim 1, wherein the clamping legs of the clamping means being arranged at right angles to one another and in each case a vertical and horizontal clamping leg being provided for fixing the transverse profile and depth profile engaged on the fixing extensions, as well as two vertical, clamping legs arranged at right angles to one another for fixing the vertical profile mounted on the fixing extensions.

3. Basic rack according to claim 2, wherein for guiding the connecting element the clamping means has one hole being formed at the intersection of the clamping legs and in the fastening position being aligned with a hole in the corner connector.

4. Basic rack according to claim 3, wherein the transverse profiles, depth profiles and vertical profiles being constructed as hollow profiles and in cross-section as a right-angled triangle, the corner connectors having complimentary, triangular fixing extensions, wherein the fixing extensions have lateral faces forming the right angle of the fixing extensions and the mountable transverse profiles, depth profiles and vertical profiles having lateral faces forming the right angles being directed towards an inner area of the basic rack.

5. Basic rack according to claim 4, wherein the transverse profiles, depth profiles and vertical profiles engaged on the fixing extensions and fixed with the aid of the clamping means being connected detachably or undetachably to the corner connectors.

6. Basic rack according to claim 5, wherein a fastening screw is used as connecting element for the clamping means and the transverse profiles, depth profiles and vertical profiles mounted on the fixing extensions and a hole in a corner part of the corner connector being provided with a thread.

7. Basic rack according to claim 6, wherein the clamping means having on the clamping legs protuberances the fixing extensions being provided with recesses, which have a complimentary construction to the protuberances of the clamping means and that the transverse profiles, depth profiles and vertical profiles mounted on the fixing extensions can be fixed by frictional and positive engagement to the corner connector following the fastening of the clamping means to said corner connector.

8. Basic rack according to claim 6, wherein the fixing extensions of the corner connector being provided with engagement elements and the transverse profiles, depth profiles and vertical profiles have recesses for receiving the engagement elements in the fastening position.

9. Basic rack according to claim 6, wherein the fixing extensions of the corner connector being provided with a through hole, which is positioned horizontally, the transverse profiles, depth profiles and vertical profiles being provided with a hole aligned in the engaged fastening position and the hole having a smaller diameter than the through hole and projecting material can be pressed into the through hole.

10. Basic rack according to claim 6, wherein the fixing extensions of the corner connectors having grooves for receiving an adhesive and the transverse profiles, depth profiles and vertical profiles can be fixed by adhesion to the fixing extensions.

11. Basic rack according to claim 1, wherein the corner connectors and clamping means being manufactured as aluminium castings and the transverse profiles, depth profiles and vertical profiles being manufactured from an extruded aluminium section.

12. Basic rack according to claim 1, wherein the corner connectors and clamping means being manufactured as aluminium castings and the transverse profiles, depth profiles and vertical profiles being manufactured from a rolled steel section.

13. Basic rack comprising:
transverse profiles, depth profiles and vertical profiles, which are connected by corner connectors,
each corner connector having three fixing extensions for mounting and fixing a transverse profile, a depth profile and a vertical profile,
one clamping means being provided for the fixing of one transverse profile, depth profile and vertical profile mounted on the fixing extensions of the corner connector, the clamping means having clamping legs for a clamping retention of the transverse profile, depth profile and vertical profile mounted on the fixing extensions, the clamping means being fixable to the corner connector with the aid of one connecting element and having for guiding the connecting element one hole aligned with a hole in the corner connector in a fastening position.

14. Basic rack comprising:
transverse profiles, depth profiles and vertical profiles, connected by corner connectors,
each corner connector having three fixing extensions for mounting and fixing a transverse profile, a depth profiles and a vertical profile,
one clamping means being provided for the fixing of one transverse profile, depth profile and vertical profile mounted on the fixing extensions of the corner connector, the clamping means having clamping legs for a clamping retention of the transverse profile, depth profile and vertical profile mounted on the fixing extensions, and the clamping means being fixable to the corner connector with the aid of one connecting element,
wherein in each case two clamping legs being provided for the clamping retention of the transverse profile, depth profile and vertical profile,
wherein the two clamping legs of the clamping means being arranged at right angles to one another and in each case a vertical and horizontal clamping leg being provided for fixing the transverse profile and depth profile engaged on the fixing extensions, as well as two vertical, clamping legs arranged at right angles to one another for fixing the vertical profile mounted on the fixing extensions.

15. Basic rack according to claim 14, wherein for guiding the connecting element the clamping means has one hole being formed at the intersection of the clamping legs and in the fastening position being aligned with a hole in the corner connector.

16. Basic rack according to claim 15, wherein the transverse profiles, depth profiles and vertical profiles being constructed as hollow profiles and in cross-section as a right-angled triangle, the corner connectors having complimentary, triangular fixing extensions, wherein the fixing extensions have lateral faces forming the right angle of the fixing extensions and the mountable transverse profiles, depth profiles and vertical profiles having lateral faces forming the right angles being directed towards an inner area of the basic rack.

17. Basic rack according to claim 16, wherein the transverse profiles, depth profiles and vertical profiles engaged on the fixing extensions and fixed with the aid of the clamping means being connected detachably or undetachably to the corner connectors.

18. Basic rack according to claim 17, wherin a fastening screw is used as connecting element for the clamping means and the transverse profiles, depth profiles and vertical profiles mounted on the fixing extensions and a hole in a corner part of the corner connector being provided with a thread.

19. Basic rack according to claim 18, wherein the clamping means having on the clamping legs protuberances, the fixing extensions being provided with recesses, which have a complimentary construction to the protuberances of the clamping means and that the transverse profiles, depth profiles and vertical profiles mounted on the fixing extensions can be fixed by frictional and positive engagement to the corner connector following the fastening of the clamping means to said corner connector.

20. Basic rack according to claim 18, wherein the fixing extensions of the corner connector being provided with engagement elements and the transverse profiles, depth profiles and vertical profiles have recesses for receiving the engagement elements in the fastening position.

21. Basic rack according to claim 18, wherein the fixing entensions of the corner connector being provided with a through hole, which is positioned horizontally, the transverse profiles, depth profiles and vertical profiles being provided with another hole aligned in the engaged fastening position and the another hole having a smaller diameter than the through hole and projecting material can be pressed into the through hole.

22. Basic rack according to claim 18, wherein the fixing extensions of the corner connectors having grooves for receiving an adhesive and the transverse profiles, depth profiles and vertical profiles can be fixed by adhesion to the fixing extensions.

23. Basic rack according to claim 14, wherein the corner connectors and clamping means being manufactured as aluminium castings and the transverse profiles, depth profiles and vertical profiles being manufactured from an extruded aluminium section.

24. Basic rack according to claim 14, wherein the corner connectors and clamping means being manufactured as aluminum castings and the transverse profiles, depth profiles and vertical profiles being manufactured from a rolled steel section.

25. Basic rack comprising:

transverse profiles, depth profiles and vertical profiles, which are connected by corner connectors, each corner connector having three fixing extensions for mounting and fixing a transverse profile, a depth profile and a vertical profile, one clamping means being provided for the fixing of one transverse profile, depth profile and vertical profile mounted on the fixing extensions of the corner connector, the clamping means having clamping legs for a clamping retention of the transverse profile, depth profile and vertical profile mounted on the fixing extensions, the clamping means being fixable to the corner connector with the aid of one connecting element and having for guiding the connecting element one hole aligned with another hole in the corner connector in a fastening position, wherein the transverse profiles, depth profiles and vertical profiles being constructed as hollow profiles and in cross-section as a right-angled triangle, the corner connectors having complimentary, triangular fixing extensions, wherein the fixing extensions have lateral faces forming the right angle of the fixing extensions have lateral facesa forming the right angle of the fixing extensions and the mountable transverse profiles, depth profiles and verticals profiles having lateral faces forming the right angles being directed towards an inner area of the basic rack, wherein in each case two clamping legs of the clamping means being provided which are arranged at right angles to one another and in each case a vertical and horizontal clamping leg being provided for fixing transverse profile and depth profile engaged on the fixing extensions, as well as two vertical, clamping legs arranged at right angles to one another for fixing the vertical profile mounted on the fixing extensions.

* * * * *